UNITED STATES PATENT OFFICE.

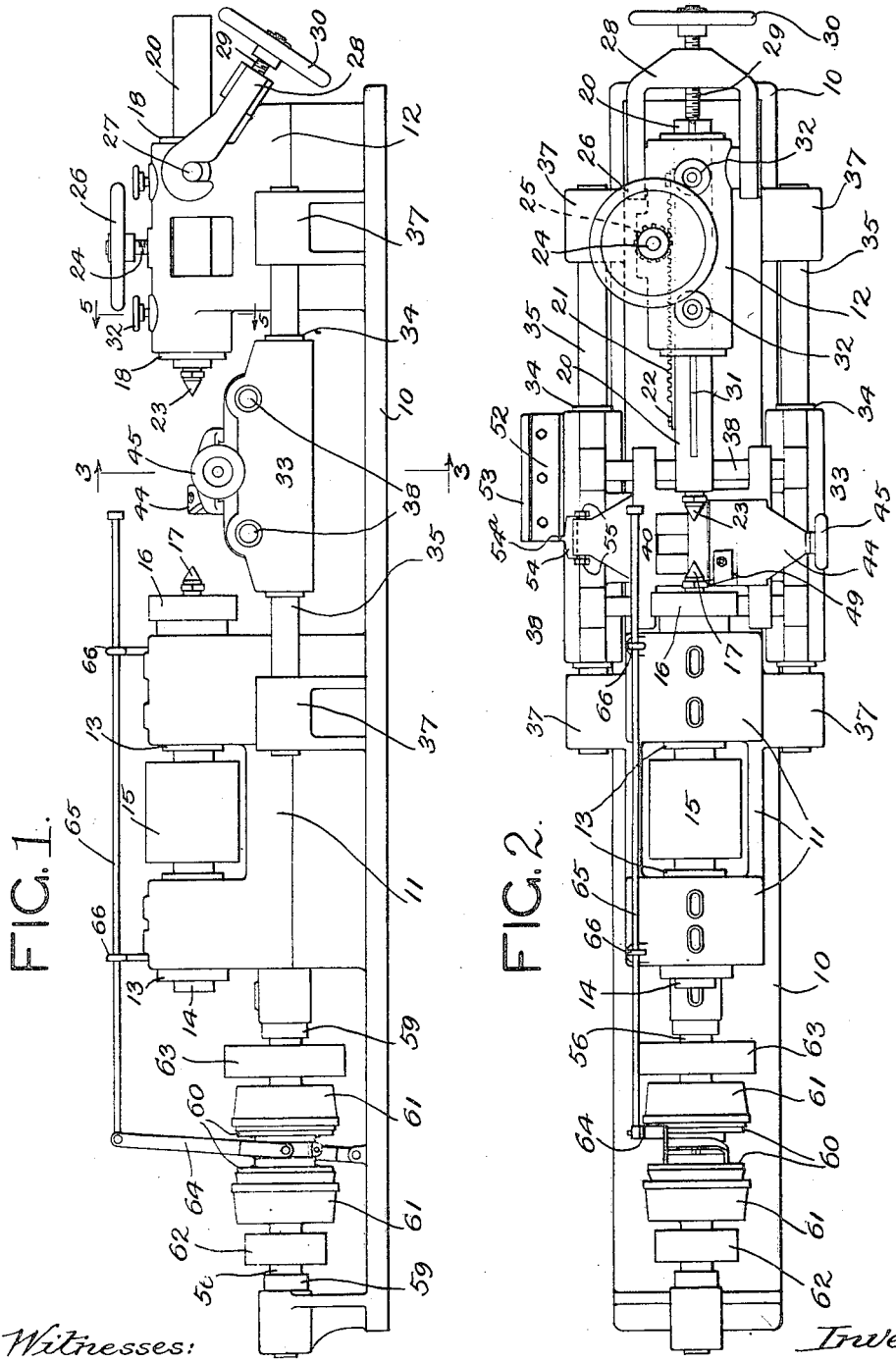

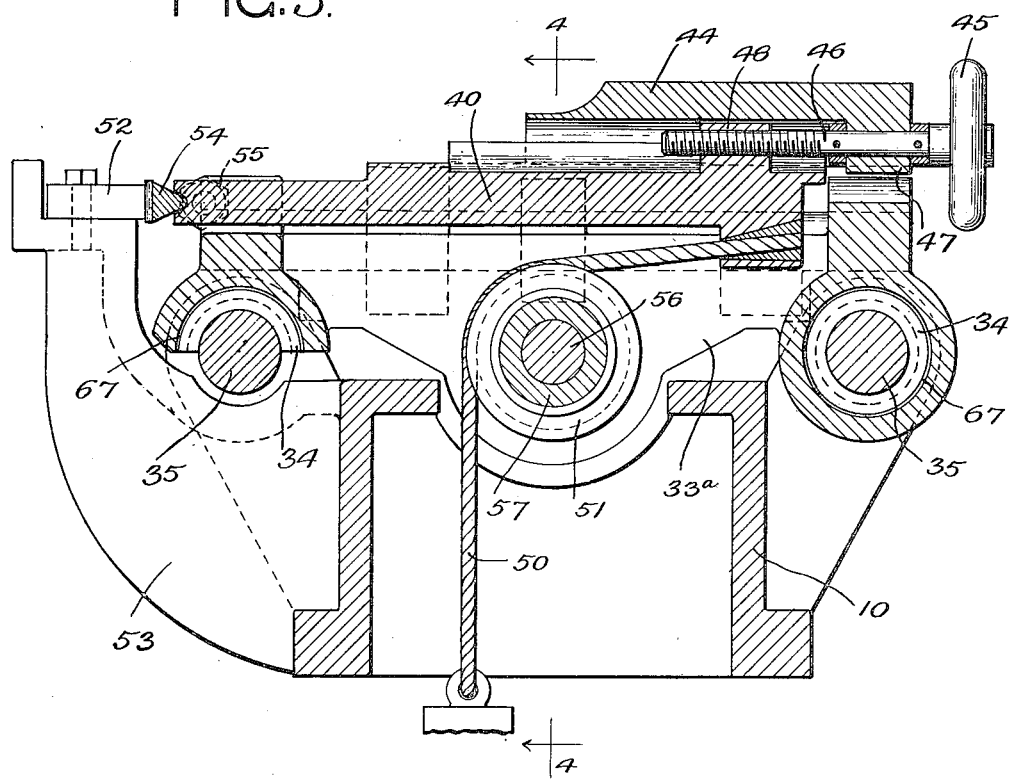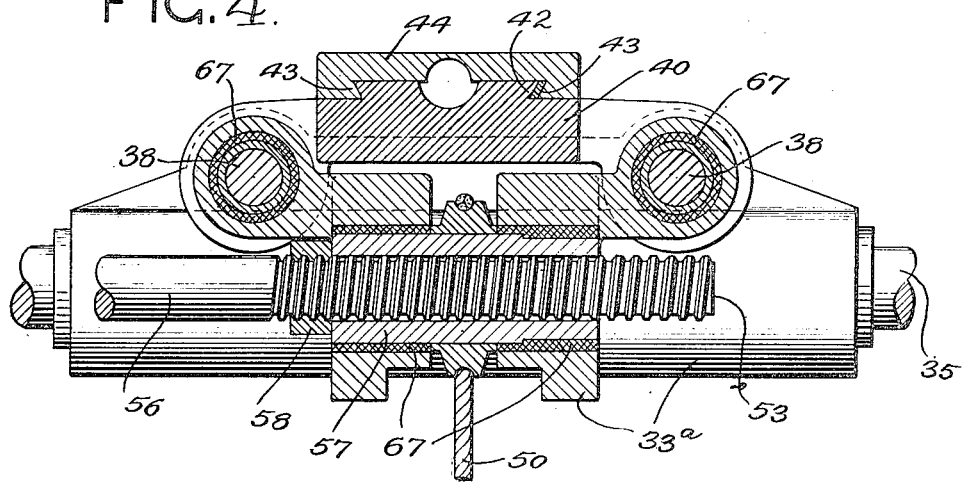

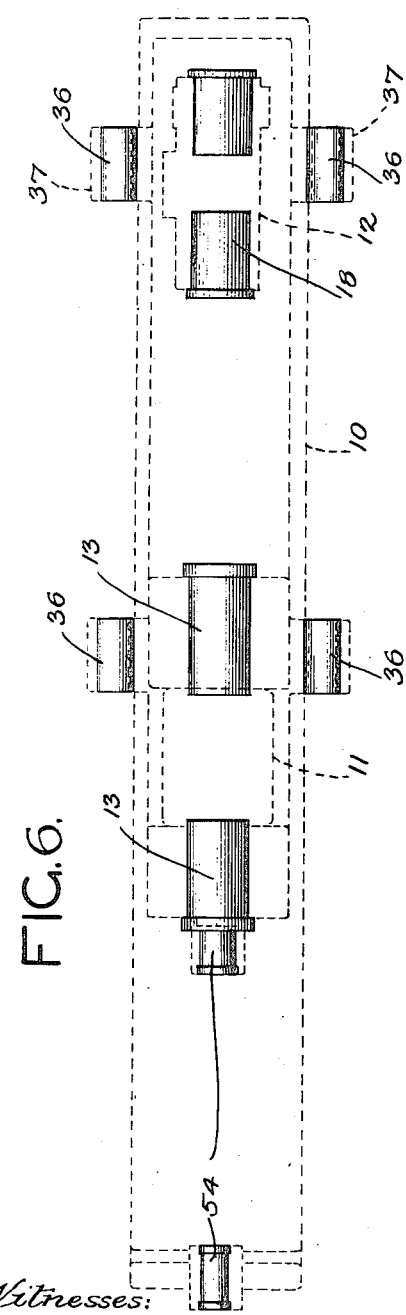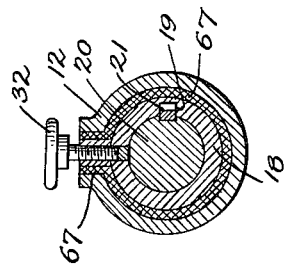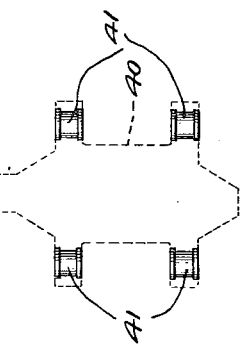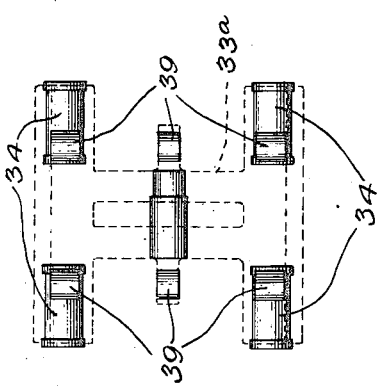

LUCIEN I. YEOMANS, OF CHICAGO, ILLINOIS, ASSIGNOR TO AMALGAMATED MACHINERY CORPORATION, OF CHICAGO, ILLINOIS, A CORPORATION OF NEW YORK.

LATHE OR THE LIKE.

1,154,155.  Specification of Letters Patent.  Patented Sept. 21, 1915.

Application filed July 19, 1915. Serial No. 40,538.

*To all whom it may concern:*

Be it known that I, LUCIEN I. YEOMANS, a citizen of the United States, residing at Chicago, in the county of Cook and State of Illinois, have invented certain new and useful Improvements in Lathes or the like, of which the following is a specification.

This invention relates to a machine of the lathe type which is adapted to perform the operations of cutting off and facing, turning the periphery of cylindrical surfaces either in a line parallel to the axis or to conform to any predetermined, irregular contour, boring the interior of hollow cylindrical shapes either parallel to the axis of revolution or to conform to a predetermined, irregular concentric contour, reaming, tapping and other operations that may be performed on ordinary engine lathes.

One of the objects of the invention is to produce a machine of this character which may be built in much less time and more cheaply than any machine of the kind now known. To this end, all of the bearing parts of the machine, such as guide-rods, bearing sleeves and the like, are made of stock shafting, bushings, etc., and in constructing the machine the bushings are suitably lined up and supported in the positions they are to occupy in the enlarged holes or spaces provided therefor in the castings, and said bushings are so fixed by pouring molten metal therearound to fill such spaces in the castings. The filling metal employed is one which will expand in cooling, for example type-metal. In this way all of the machine operations involved in the construction of lathes of the ordinary type have been eliminated, the working faces of relatively movable parts being provided by stock material. This permits the use of bearing surfaces of any metal desired, and they may be dissimilar metals or metals of a refractory character which could not be melted or poured in the manner of ordinary Babbitt bearings.

Another object of the invention is to provide a novel and improved construction of the tool carriage and the means for controlling the tool to determine the contour of the surface on the work.

A further object has to do with the improvement in construction of the tail stock.

The invention also relates to other details of improvement which will be fully set forth in the following description.

In the accompanying drawings Figures 1 and 2 are respectively a side elevation and a plan view of a machine embodying the features of my invention. Fig. 3 is a transverse section through the machine, taken in the plane of line 3—3 of Fig. 2. Fig. 4 is a sectional view of the carriage on line 4—4 of Fig. 3. Fig. 5 is a transverse section through the tail stock on line 5—5 of Fig. 1. Fig. 6 is a skeleton or diagrammatic view illustrating the location of the principal bearing bushings in the body part of the machine. The outlines of the bed, head stock and tail stock are indicated in dotted lines. Figs. 7 and 8 are similar skeleton views showing the bearing bushings which are mounted in the castings of the tool carriage.

The preferred embodiment of the invention is illustrated in the drawings, and will be herein described in detail, without any intention, however, of limiting the invention to the structure disclosed except as recited in the appended claims.

The machine comprises a suitable bed 10 from one end of which rises the head stock 11, and from the opposite end the tail stock 12. In the present instance, the head stock and tail stock are cast integral with the bed.

The head stock has at its upper side two alined bearing sleeves or bushings 13 in which is rotatably mounted a spindle 14 having a suitable pulley 15 fixed thereon between the bearings 13 and having the usual face-plate 16 and center 17 fixed on one end.

In the tail stock 12 are mounted two bearing sleeves 18 each of which has a longitudinal groove 19 in its inner surface. A shaft or spindle 20 is mounted to slide longitudinally through the sleeves 18, and said spindle has a rack-bar 21 suitably fixed thereto as by cap-screws 22, said rack-bar sliding in the grooves 19 of the sleeves 18 and preventing rotary movement of the spindle 20. In one end of the spindle is the usual center member 23 for supporting the work. A shaft 24 has a pinion 25 fixed on its lower end and meshing with the rack-bar 21, and on the upper end of said shaft is fixed a hand-wheel 26 by rotating which a rapid longitudinal adjustment may be imparted to the spindle 20.

A pair of stud shafts 27 projecting from opposite sides of the tail stock provide bearings for the arms of a yoke 28 in which is mounted a screw 29 having a hand-wheel 30 thereon, the tip of said screw being arranged to engage in a recess in the end of the spindle 20 when the yoke is swung up into proper position so that by rotating the screw the spindle may be given a powerful but slow, longitudinal movement. Preferably the upper face of the spindle 20 is flattened as at 31, and one or more clamp screws 32 are mounted in the tail stock in position to be turned down against the flattened face 31 to rigidly lock the spindle against movement after it has been adjusted to the proper position.

The traveling tool carriage as a whole is indicated by reference numeral 33. This carriage has at opposite sides two pairs of bearing sleeves 34 by which the carriage is slidably supported upon a pair of guide-rods 35 at opposite sides of the machine. The ends of these guide-rods are mounted in sleeves 36 which are mounted in supporting lugs 37 integral with the bed 10.

The carriage comprises a base 33ª in which the sleeves 34 are mounted, and on this base are mounted two guide-rods 38 extending transversely of the machine, said rods having their ends supported in bearing sleeves 39 in the base. Upon the guide-rods 38 is mounted a cross-slide 40 which has bearing sleeves 41 inclosing said guide-rods. On the upper face of the cross-slide are dovetailed guides 42, which coöperate with similar guides 43 on a tool-support or holder 44 whereby the latter may be adjusted transversely of the machine with reference to the cross-slide and the base 38. The tool holder is arranged to be adjusted by suitable means such as a hand-wheel 45 and screw 46, the latter being mounted in a lug 47 on the holder 44 and being threaded in an upstanding lug 48 on the cross-slide 40.

49 indicates the tool which may be secured in the holder 44 in any common or preferred way.

The cross-slide 40 is constantly drawn toward one side of the machine by means of a weighted cable 50 attached to the slide and passing around a sheave 51 supported by the base 38. The movement of the cross-slide is limited by a master former 52 which is detachably mounted upon a bracket 53 rising from one side of the bed of the machine. The shape of this former determines the contour which the tool will impart to the work, the weighted cable holding the cross-slide against said former. In the adjacent edge of the cross-slide is a rounded groove 53 in which the wedge-shaped edge of a bearing shoe 54 engages. The opposite side of said shoe has a vertical rib 54ª which contacts the guide face of the master former 52. The shoe is supported merely by the cross-slide bearing against it and holding it in engagement with said former. The shoe is held against endwise movement with reference to the slide by means of cap-screws 55 seated in the slide and having their heads overlying the shoe. It will be seen that the shoe is capable of a rocking movement to accommodate itself to the guiding edge of the master former. Thus even though said former is not set exactly true, due, for example, to imperfect casting of the bracket 53, the shoe will operate satisfactorily.

The feed-screw 56 by which the carriage is fed lengthwise of the machine, has a bearing in a sleeve 57 which is mounted in the mid-portion of the carriage-base 38, the sheave 51 occupying a slot in said mid-portion and being rotatably mounted on the sleeve 57. An interiorly-threaded nut 58 is rigidly secured to the carriage-base and coöperates with the feed-screw to traverse the carriage.

The feed-screw shaft 53 is also mounted in bushings 59 in the head stock and the bed 10, and is driven by suitable reversible means, which in the present instance comprises a friction cone 60 splined on the feed-screw shaft and arranged to be moved into engagement with either one of two friction clutch members 61 loosely mounted upon the feed-screw shaft. The clutch members 61 have hubs upon which are fixed two driving pulleys 62 and 63, which in practice are driven in opposite directions. The feed-screw may thus be rotated in opposite directions by moving the clutch cone 60 into engagement with the proper coöperating element 61. Said cone is arranged to be moved by a suitable lever 64 connected thereto and a horizontal rod 65 attached to said lever and sliding through guides 66 on the head stock, the opposite end of the rod lying in position to be conveniently grasped by the operator.

In constructing the machine the main castings are molded with enlarged openings or recesses therein at the points where working parts or bearings are to be positioned. Finished stock bushings of the proper size are then suitably supported in working position within said recesses in the castings, and the space surrounding each bushing within its recess is filled by pouring therein a suitable molten metal which has the characteristic of expanding in cooling. When this filling metal has cooled and set, the bushings will be accurately held in working position and are ready to receive the spindles, guide-rods, and other parts of the machine.

In Fig. 6 are shown the main bushings 13, 18, 36, 54 of the body portion of the machine, in the relative positions they occupy, the bed, head stock and tail stock being indicated in dotted lines.

Fig. 7 shows the positions of the bushings 34, 39, 52, in the carriage base and Fig. 8 shows the bushings 41 of the cross-slide.

The filling metal which holds all of these bushings in place is indicated wherever it appears in the drawings by reference numeral 67.

I claim as my invention:

1. A machine of the character described having, in combination, a bed, a head stock and a tail stock formed in an integral casting, a pair of bearing sleeves in the head stock, a pair of bearing sleeves in the tail stock, spindles mounted in the respective sleeves, two pairs of sleeves mounted on opposite sides of the machine bed, all of said sleeves being of stock material and occupying recesses in the mentioned casting and secured therein by fusible metal, a pair of guide-rods having their ends supported in the bearing sleeves on said bed, said rods being formed of stock shafting, and a carriage comprising a support having bearing sleeves embedded in its opposite sides and surrounding said guide-rods for supporting and guiding the carriage.

2. A machine of the character described having, in combination, a bed, a head stock, a tail stock, said head stock having a bearing sleeve therein, a spindle rotatably mounted in said sleeve, a bearing sleeve in said tail stock, a spindle movably mounted in the latter sleeve, bearing sleeves mounted on the bed, guide-rods having their ends supported in the latter sleeves, all of said sleeves being formed of stock material and occupying recesses in their respective supports and secured therein by fusible metal, said guide-rods being formed of stock shafting, and a suitable tool carriage slidably mounted on said guide-rods.

3. A machine of the character described having, in combination, a bed, a head stock, a tail stock, bearing sleeves in the head stock and the tail stock, respectively, spindles in the respective bearing sleeves, two pairs of alined bearing sleeves at opposite sides of said bed supported in lugs rising from the bed, all of said bearing sleeves occupying recesses in their respective supports and secured therein by fusible metal, two guide-rods, each having its ends supported in the two bearing sleeves at one side of the bed, and a suitable tool carriage mounted to slide on said guide-rods.

4. A machine of the character described comprising, in combination, a head stock, a tail stock, bearing sleeves mounted respectively in the head stock and the tail stock, spindles mounted in the respective sleeves, said sleeves occupying recesses in their supports and secured therein by fusible metal, and a suitable tool support mounted between the head stock and the tail stock.

5. A machine of the character described comprising, in combination, a bed, a head stock, a tail stock, spindles mounted respectively in the head stock and the tail stock, two pairs of lugs located at opposite sides of the bed, a bearing sleeve in each lug, said sleeves occupying openings in the lugs and secured therein by fusible metal, two guide-rods each having its ends supported in one pair of said sleeves, and a suitable tool carriage mounted to slide on said guide-rods.

6. A machine of the character described comprising, in combination, a bed, a head stock, a tail stock, two pairs of alined bearing sleeves mounted on the bed at opposite sides of the latter, said sleeves occupying recesses in the casting of the bed and secured therein by fusible metal, two guide-rods located at opposite sides of the bed, each having its ends supported in one pair of said sleeves, and a suitable tool carriage slidably mounted on said guide-rods.

7. A machine of the character described having a plurality of bearing bushings formed of stock material and having castings provided with recesses in which said bushings are secured by means of fusible metal, guide-rods supported in certain of said bushings and formed of stock shafting, a tool carriage mounted on said guide-rods, and operating means mounted in the other bushings.

8. A machine of the character described having a plurality of bearing bushings, castings having recesses in which said bushings are mounted, the bushings being held in said recesses by fusible metal surrounding the bushings, and certain of the bushings forming bearings for the working parts of the machine.

9. A lathe having, in combination, a suitable bed, a head stock and a tail stock thereon, a carriage mounted to travel lengthwise of said bed, said carriage comprising a base portion which consists of a casting in which are embedded two pairs of bearing sleeves formed of stock material, two guide-rods having their ends supported in said sleeves and disposed transversely of the machine, a slide comprising a casting having opposite bearing sleeves of stock material embedded therein, the latter bearing sleeves surrounding said guide-rods, a tool suitably supported on said slide, a weighted cable attached to said slide and tending to move the latter in one direction, and a master former against which the slide abuts and which controls the contour to be imparted to the work by the tool.

10. A lathe having, in combination, a suitable support, a head stock and a tail stock thereon, guide-ways on said support, a tool carriage mounted on said guide-ways to travel parallel to the axis of the spindles of the head stock and tail stock, said carriage comprising a slide mounted on the base of the carriage to move transversely of the machine, a tool suitably supported on said slide, a weighted cable attached to said slide and tending to move the latter in one direction, and a master former against which the slide abuts and which controls the contour to be imparted to the work by the tool on said slide.

11. A lathe having, in combination, a bed, longitudinal guide-rods on said bed, a carriage comprising a base casting having bearing sleeves at opposite sides embedded in the casting, said sleeves surrounding said guide-rods for supporting and guiding the carriage, the carriage base further having two pairs of bushings embedded therein, two guide-rods having their ends supported in said bushings and disposed at right angles to the first mentioned guide-rods, a slide comprising a casting having opposite bearing sleeves embedded therein and surrounding the latter guide-rods for supporting and guiding said slide, means for controlling the position of said slide on its guide-rods with respect to the carriage base, and a tool suitably supported on said slide.

12. A lathe having, in combination, a suitable support, a tail stock thereon, a bearing sleeve mounted on said tail stock and having an interior longitudinal guide-groove, a spindle slidably mounted in said sleeve, a rack-bar rigidly fixed to said spindle and sliding in said groove, a pinion meshing with said rack-bar, a hand-wheel for rotating said pinion to effect a quick longitudinal movement of said spindle, a yoke having the free ends of its arms pivoted on the tail stock, and a hand-screw mounted in the base of the yoke and arranged to engage the end of the spindle when the yoke is swung up into proper position, whereby to effect a slow but powerful feed of the spindle.

13. A lathe having, in combination, a tail stock, a spindle mounted therein, a yoke having the free ends of its arms pivoted to said tail stock, a hand-screw mounted in the base of said yoke and arranged to engage the end of said spindle when the yoke is swung up into proper position to feed the spindle longitudinally.

In testimony whereof, I hereunto set my hand in the presence of two witnesses.

LUCIEN I. YEOMANS.

In the presence of—
  Geo. F. Bryant,
  M. E. O'Hara.